US012051554B2

(12) United States Patent
Gaddi

(10) Patent No.: US 12,051,554 B2
(45) **Date of Patent: *Jul. 30, 2024**

(54) MEMS SWITCH WITH MULTIPLE PULL-DOWN ELECTRODES BETWEEN TERMINAL ELECTRODES

(71) Applicant: Qorvo US, Inc., Greensboro, NC (US)

(72) Inventor: Roberto Gaddi, Rosmalen (NE)

(73) Assignee: Qorvo US, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,243

(22) Filed: May 1, 2023

(65) Prior Publication Data

US 2023/0268154 A1 Aug. 24, 2023

Related U.S. Application Data

(63) Continuation of application No. 17/084,555, filed on Oct. 29, 2020, now Pat. No. 11,640,891.

(51) Int. Cl.
*H01H 59/00* (2006.01)

(52) U.S. Cl.
CPC . *H01H 59/0009* (2013.01); *H01H 2059/0027* (2013.01); *H01H 2059/0072* (2013.01)

(58) Field of Classification Search
CPC ....... H01H 59/0009; H01H 2059/0027; H01H 2059/0072; B81B 2201/0221; B81B 3/0078; B81B 7/0006; B81B 7/008
See application file for complete search history.

(56) References Cited

U.S. PATENT DOCUMENTS

| | | | | |
|---|---|---|---|---|
| 9,221,672 | B2 * | 12/2015 | Shimanouchi | B81C 1/00134 |
| 11,640,891 | B2 * | 5/2023 | Gaddi | H01H 59/0009 335/78 |
| 2016/0297677 | A1 * | 10/2016 | Huffman | H01G 5/16 |
| 2020/0343067 | A1 | 10/2020 | Schepens et al. | |
| 2020/0402756 | A1 | 12/2020 | Gaddi et al. | |

(Continued)

OTHER PUBLICATIONS

E. R. Brown, "RF-MEMS switches for reconfigurable integrated circuits," IEEE Transactions on Microwave Theory and Techniques, vol. 4, pp. 1868-1880.

(Continued)

*Primary Examiner* — Ahmed M Saeed
(74) *Attorney, Agent, or Firm* — Withrow & Terranova, P.L.L.C.

(57) ABSTRACT

The disclosure is directed to microelectromechanical system (MEMS) switches with multiple pull-down electrodes between terminal electrodes to limit off-state capacitance. In exemplary aspects disclosed herein, a plurality of pull-down electrodes are positioned between the input terminal electrode and the output terminal electrode. The plurality of pull-down electrodes are offset from each other to limit off-state capacitance between the input terminal electrode and the output terminal electrode. The separation between the pull-down electrodes disrupts the off-state capacitive path between the input terminal electrode and the output terminal electrode, thereby further insulating the contacts from each other. Limiting off-state capacitance reduces on-state electrical loss and increases off-state electrical isolation for improved performance.

14 Claims, 11 Drawing Sheets

(56) References Cited

U.S. PATENT DOCUMENTS

2022/0139656 A1 5/2022 Gaddi

OTHER PUBLICATIONS

Y. Lee, Y. Jang, J. Kim and Y. Kim, "A 50-110 GHz ohmic contact RF MEMS silicon switch with high isolation," 2010 IEEE 23rd International Conference on Micro Electro Mechanical Systems (MEMS), Wanchai, Hong Kong, 2010, pp. 759-762.

F. M. Ozkeskin, S. Choi, K. Sarabandi and Y. B. Gianchandani, "Batch-Fabricated High-Power RF Microrelays With Direct On-PCB Packages," in Journal of Microelectromechanical Systems, vol. 21, No. 4, pp. 990-1001, Aug. 2012.

G. M. Rebeiz and J. B. Muldavin, "RF MEMS switches and switch circuits," IEEE Microwave Magazine, vol. 2, No. 4, pp. 59-71, Dec. 2001.

Non-Final Office Action for U.S. Appl. No. 17/084,555, mailed May 23, 2022, 10 pages.

* cited by examiner

MEMS SWITCH WITH MULTIPLE PULL-DOWN ELECTRODES BETWEEN TERMINAL ELECTRODES

RELATED APPLICATION

This application is a continuation of application Ser. No. 17/084,555, filed Oct. 29, 2020, now U.S. Pat. No. 11,640,891, the disclosure of which are hereby incorporated herein by reference in its entirety.

FIELD OF THE DISCLOSURE

The present invention relates to a microelectromechanical system (MEMS) switch, systems, and devices. In particular, the present invention relates to a MEMS switch with multiple pull-down electrodes between terminal electrodes to limit off-state capacitance.

BACKGROUND

Microelectromechanical system (MEMS) switches provide high-performance relays that operate across a wide variety of frequency ranges. Unwanted or parasitic capacitance may occur in MEMS switches, such as between the input terminal electrode and the output terminal electrode. Such parasitic capacitance is undesirable as it results in on-state electrical loss and off-state electrical coupling. Reducing this off-state capacitance is desirable, such as to enable more advanced relay applications as tuning elements.

SUMMARY

Embodiments of the disclosure are directed to microelectromechanical system (MEMS) switches with multiple pull-down electrodes between terminal electrodes to limit off-state capacitance. In exemplary aspects disclosed herein, a plurality of pull-down electrodes are positioned between the input terminal electrode and the output terminal electrode. The plurality of pull-down electrodes are offset from each other to limit off-state capacitance between the input terminal electrode and the output terminal electrode. The separation between the pull-down electrodes disrupts the off-state capacitive path between the input terminal electrode and the output terminal electrode, thereby further insulating the contacts from each other. Limiting off-state capacitance reduces on-state electrical loss and increases off-state electrical isolation for improved performance.

One embodiment of the disclosure relates to a microelectromechanical system (MEMS) switch including an input terminal electrode, an output terminal electrode, a plurality of pull-down electrodes positioned between the input terminal electrode and the output terminal electrode, and a beam element. The beam element is configured to move between an on-state adjacent to the plurality of pull-down electrodes to electrically couple the input terminal electrode and the output terminal electrode to the beam element and an off-state away from the plurality of pull-down electrodes to electrically isolate the input terminal electrode and the output terminal electrode from the beam element. The plurality of pull-down electrodes are offset from each other to limit off-state capacitance between the input terminal electrode and the output terminal electrode.

An additional embodiment of the disclosure relates to a microelectromechanical system (MEMS), including a plurality of MEMS switches. Each switch includes an input terminal electrode, an output terminal electrode, a plurality of pull-down electrodes positioned between the input terminal electrode and the output terminal electrode, and a beam element. The beam element is configured to move between an on-state adjacent to the plurality of pull-down electrodes to electrically couple the input terminal electrode and the output terminal electrode to the beam element and an off-state away from the plurality of pull-down electrodes to electrically isolate the input terminal electrode and the output terminal electrode from the beam element. The plurality of pull-down electrodes are offset from each other to limit off-state capacitance between the input terminal electrode and the output terminal electrode.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description, serve to explain the principles of the disclosure.

DETAILED DESCRIPTION

Figure 1A:
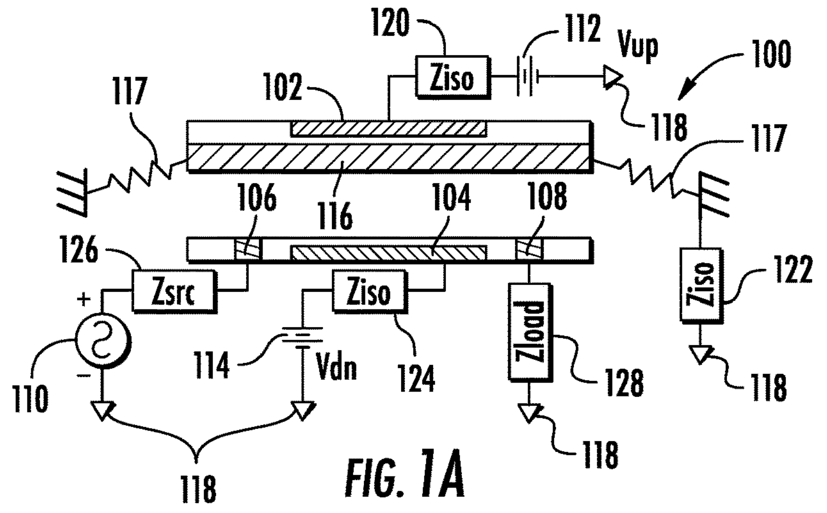
FIG. 1A is a schematic diagram of microelectromechanical system (MEMS) switch in an off-state, including a pull-up electrode and a single pull-down electrode between terminal electrodes.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It should also be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

It should be understood that, although the terms "upper," "lower," "bottom," "intermediate," "middle," "top," and the like may be used herein to describe various elements, these elements should not be limited by these terms. These terms are only used to distinguish one element from another. For example, a first element could be termed an "upper" element, and, similarly, a second element could be termed an "upper" element depending on the relative orientations of these elements, without departing from the scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

Figure 1B:
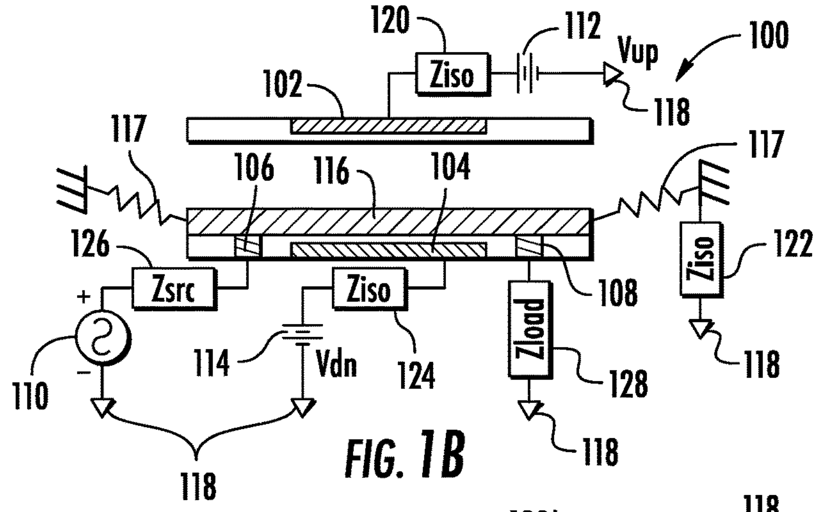
FIG. 1B is a schematic diagram of the MEMS switch of FIG. 1A in an on-state.
Figure 1C:
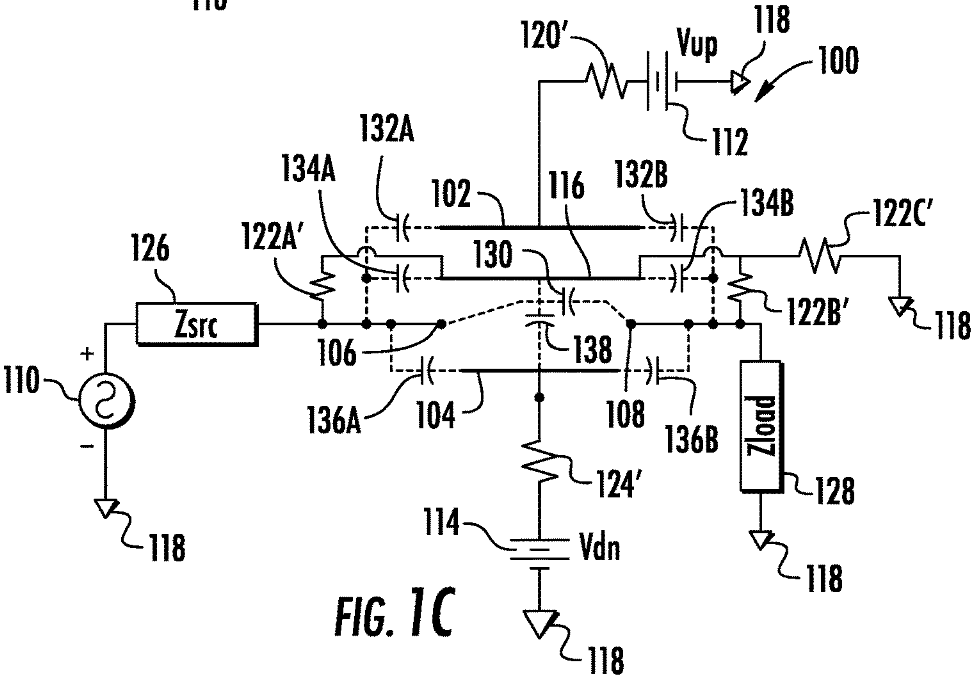
FIG. 1C is a circuit diagram of the MEMS switch of FIGS. 1A-1B illustrating off-state capacitances, including a capacitance between the terminal electrodes through the pull-down electrode.

FIGS. 1A-1C are diagrams of a microelectromechanical system (MEMS) switch 100 with a pull-up electrode 102 and a single pull-down electrode 104 between terminal electrodes 106, 108. In particular, terminal electrodes 106, 108 include an input terminal electrode 106 (may also be referred to as a first terminal electrode, input electrode, first RF electrode, etc.), and an output terminal electrode 108 (may also be referred to as a second terminal electrode, output electrode, second RF electrode, etc.). The MEMS switch 100 further includes a power source 110 coupled to the first terminal electrode 106 (via a power source circuit), a voltage up coupling (Vup) 112 coupled to a pull-up electrode 102, and a voltage down coupling (Vdn) 114 coupled to the pull-down electrode 104.

The MEMS switch 100 (may also be referred to herein as a MEMS relay, MEMS ohmic switch, etc.) further includes a moveable beam 116 (may also be referred to as a floating beam) mechanically anchored at both ends by flexible anchors 117 (e.g., springs). In this way, the moveable beam 116 is configured to move between a first position (off-state) and a second position (on-state) for up and down electrostatic actuation. The moveable beam 116 is connected to a ground connection 118.

Referring to FIG. 1A, the MEMS switch 100 is in the off-state (may also be referred to as a pull-up state) where the moveable beam 116 of the MEMS switch 100 is pulled up toward the pull-up electrode 102. In the first position, the moveable beam 116 is disposed adjacent to the first electrode 102, the input terminal electrode 106, and the output terminal electrode pull-up electrode 102 and spaced from the pull-down electrode 104, the input terminal electrode 106, and the output terminal electrode 108.

Referring to FIG. 1B, the MEMS switch 100 is in the on-state (may also be referred to as a pull-down state), where a movable beam 116 of the MEMS switch 100 is pulled down towards the pull-down electrode 104. In the second position, the moveable beam 116 is disposed adjacent to the pull-down electrode 104 and spaced from the pull-up electrode 102.

The MEMS switch 100 further includes an up isolation circuit 120 between the pull-up electrode 102 and the Vup coupling 112 (may also be referred to as Vup connection, Vup source, etc.), a second isolation circuit 122 disposed between the moveable beam 116 and electrical ground potential 118, and a down isolation circuit 124 between the pull-down electrode 104 and the Vdn coupling 114 (may also be referred to as Vdn connection, Vdn source, etc.). Each of the isolation circuits 120, 122, 124 (may be referred to as Ziso) includes at least one resistor. The isolation circuits 120, 122, 124 isolate the MEMS switch 100 to prevent RF leakage (e.g., through the Vup coupling 112, the Vdn coupling 114, and/or the ground connection 118) by adding electrical impedance at RF leakage points. The source impedance of the MEMS switch 100 is represented by Zsrc 126, and the load impedance of the MEMS switch 100 is represented by Zload 128. Additionally, the first and second isolation circuits 120, 124 are utilized to isolate the control voltage sources, such as the Vup coupling 112 and Vdn coupling 114.

The isolation circuits 120, 122, 124 provide several benefits. The isolation circuits 120, 122, 124 bias the direct current potential to allow for electrostatic actuation and further provide a path for transient currents during switching. The components of each of the isolation circuits 120, 122, 124 are chosen such that the resistance levels limit RF leakage while enabling the MEMS switch 100 to function as intended (e.g., movement speed of moveable beam 116, providing bleed current to withstand electrostatic discharge events, maintain electric potential at the pull-up electrode 102 and pull-down electrode 104 during the switching transients), among other advantages (e.g., accurate engineering of actuation waveforms). In particular, the isolation circuits 120, 122, 124 provide a high degree of reliability for the MEMS switch 100 by neutralizing charge that may accumulate during life cycling while maintaining a zero potential between touching MEMS elements. The isolation circuits 120, 122, 124 provide for leakage paths for electrostatic discharge events to further increase the reliability of the MEMS relay. The isolation circuits maintain RF performance (voltage handling, insertion loss, isolation linearity, etc.) while providing proper power handling by uniform RF current distribution.

FIG. 1C is a circuit diagram of the MEMS switch 100 of FIGS. 1A-1B illustrating off-state capacitances. In particular, the off-state capacitances include direct coupling 130 between the pull-up electrode 102 and the pull-down electrode 104, coupling via pull-up electrode 102 (e.g., input up capacitance 132A and output up capacitance 132B), coupling via moveable beam 116 (e.g., input beam capacitance 134A and output beam capacitance 134B), coupling via pull-down electrode 104 (e.g., input down capacitance 136A and output down capacitance 136B), and/or extra coupling 138 between the moveable beam 116 and the pull-down electrode 104. It is noted that the greatest coupling is via the pull-down electrode 104 as the pull-down electrode 104 is positioned proximate to and directly in between the terminal electrodes 106, 108. In certain embodiments, the capacitive coupling through the pull-down electrode 104 accounts for 60%-70% of electrical loss. Accordingly, reducing coupling via the pull-down electrode 104 would significantly reduce off-state capacitance and associated losses.

In certain embodiments, isolation circuit 120 includes resistor 120' disposed between a pull-up electrode 102 and the Vup coupling 112. In certain embodiments, isolation circuit 124 includes resistor 124' disposed between a pull-down electrode 104 and the Vdn coupling 114 such that the Vdn coupling 114 is isolated to provide proper control of voltage within the MEMS switch 100. Resistors 120', 124' are utilized to isolate the control voltage sources, such as the Vup coupling 112 and the Vdn coupling 114.

In certain embodiments, isolation circuit 122 includes resistor 122A', 122B', and/or 122C'. In particular, resistor 122C' is disposed between the movable beam 116 and DC ground connection 118 to provide a direct current bias of the movable beam 116 to DC ground connection 118. In certain embodiments, resistors 122A', 122B' are disposed adjacent to anchored ends of the movable beam 116. The resistor 122A' is disposed between the movable beam 116 and input electrode 106, and resistor 122B' is disposed between the movable beam 116 and output electrode 108. In certain embodiments, resistors 122A', 122B' are equivalent in value (e.g., about 75 Kohm to about 1.5 Mohm). In certain embodiments, the value of resistors 120', 124' is greater than resistor 122A'-122C'. In certain embodiments, resistors 122A'-122C' and may have about the same value.

In certain embodiments, resistors 122A', 122B' provide for RF isolation and provide for extra reliability of the MEMS switch 100 by neutralizing electrical change that may accumulate within the MEMS switch 100. Resistors 122A', 122B' having the second value also provides a sufficient level of "bleed" current for dissipating externally applied charge due to electrostatic discharge events. Additionally, resistors 122A', 122B' are utilized to avoid the RF-terminals from floating to an uncontrolled direct current potential when left open.

Figure 2A:
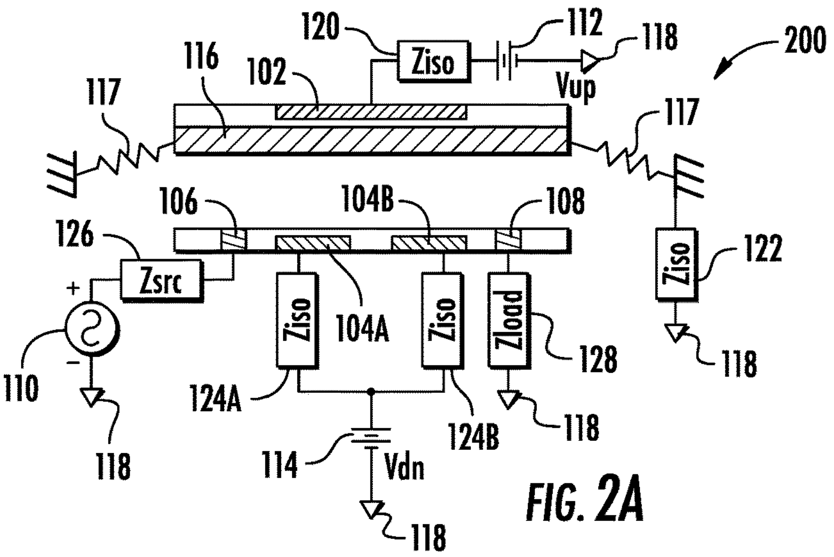
FIG. 2A is a schematic diagram cross-sectional side view of a MEMS switch in an off-state including a pull-up electrode and a plurality of pull-down electrodes between terminal electrodes.
Figure 2B:
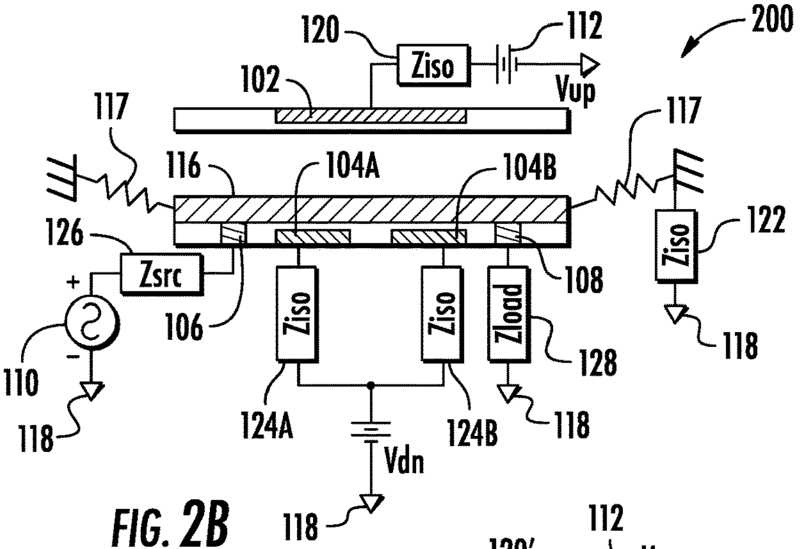
FIG. 2B is a schematic diagram of the MEMS switch of FIG. 2A in an on-state.
Figure 2C:
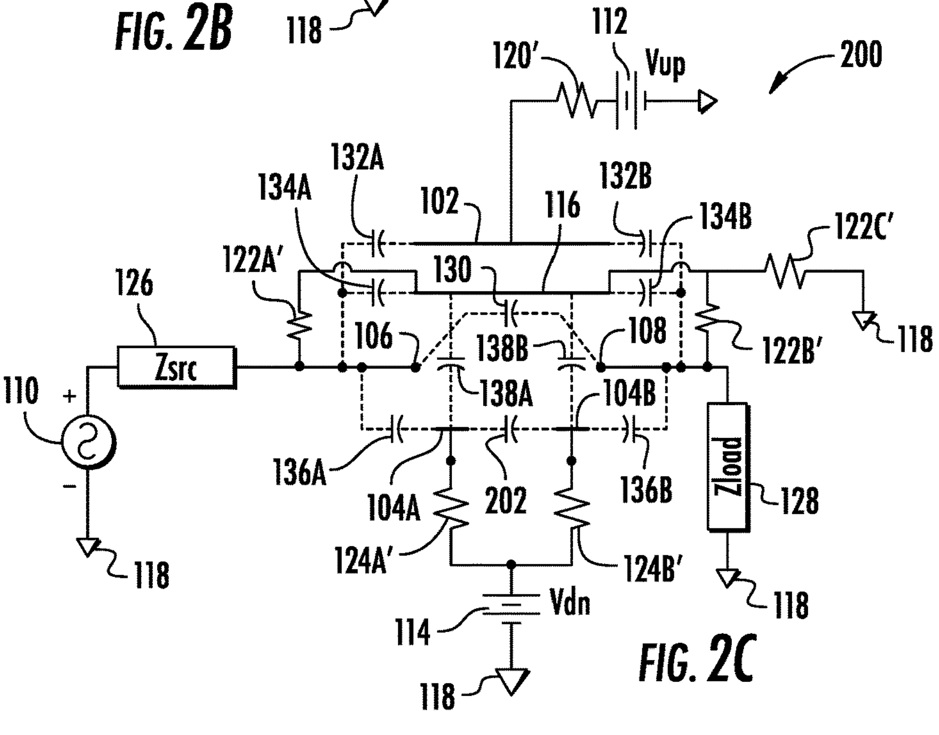
FIG. 2C is a circuit diagram of the MEMS switch of FIGS. 2A-2B illustrating off-state capacitances, including a capacitance between the terminal electrodes through the plurality of pull-down electrodes.

FIGS. 2A-2C are diagrams of a MEMS switch 200 in an off-state, including a pull-up electrode 102 and a plurality of pull-down electrodes 104A, 104B between terminal electrodes 106, 108. The MEMS switch 200 includes similar features as those discussed above with reference to FIGS. 1A-1C unless otherwise noted. In particular, the MEMS switch 200 includes an input terminal electrode 106 and an output terminal electrode 108, a pull-up electrode 102, a plurality of pull-down electrodes 104A, 104B positioned between the input terminal electrode 106 and the output terminal electrode 108, and a movable beam t 116. The pull-up electrode 102 is configured to electrically bias the movable beam 116 toward the off-state. In certain embodiments, the input terminal electrode 106 includes an input RF electrode and/or the output terminal electrode 108 includes an output RF electrode.

The movable beam 116 is configured to move between an on-state adjacent to the plurality of pull-down electrodes 104A, 104B to electrically couple the input terminal electrode 106 and the output terminal electrode 108 to the movable beam 116, and an off-state away from the plurality of pull-down electrodes 104A, 104B to electrically isolate the input terminal electrode 106 and the output terminal electrode 108 from the movable beam 116. In certain embodiments, the moveable beam 116 is coupled to an RF node.

In certain embodiments, each of the plurality of pull-down electrodes 104A, 104B are respectively coupled to an isolation circuit 124A, 124B to isolate a lower voltage source from the plurality of pull-down electrodes 104A, 104B. In certain embodiments, an isolation circuit 122 is positioned between the movable beam 116 and an electrical common ground connection 118. In certain embodiments, the pull-up electrode 102 is coupled to an up isolation circuit 120 to isolate an upper voltage source from the pull-up electrode 102.

The plurality of pull-down electrodes 104A, 104B are offset (and electrically isolated) from each other to limit off-state capacitance between the input terminal electrode 106 and the output terminal electrode 108. In certain embodiments, the plurality of pull-down electrodes 104A, 104B consists of two pull-down electrodes 104. In certain embodiments, the plurality of pull-down electrodes 104A, 104B includes three or more pull-down electrodes 104. Similarly, in certain embodiments, the MEMS switch 200 includes a plurality of pull-up electrodes 102 configured to electrically bias the movable beam 116 toward the off-state.

FIG. 2C is a circuit diagram of the MEMS switch 200 of FIGS. 2A-2B illustrating off-state capacitances, including a capacitance between the terminal electrodes 106, 108 through the plurality of pull-down electrodes 104A, 104B. The off-state capacitances include direct coupling 130, coupling via pull-up electrode 102, coupling via moveable beam 116. The off-state capacitances further include coupling 136A, 136B, 202 via the pull-down electrodes 104A, 104B, and/or extra coupling 138A, 138B between the moveable beam 116 and each of the pull-down electrodes 104A, 104B. Coupling via the pull-down electrodes 104A, 104B includes input down capacitance 136A, output down capacitance 136B, and intermediate down capacitance 202. Intermediate down capacitance 202 is between the first pull-down electrode 104A and the second pull-down electrode 104B. Separating the single pull-down electrode 104 of the MEMS switch 100 of FIG. 1 into multiple pull-down electrodes 104A, 104B further insulates the input terminal electrode 106 and the output terminal electrode 108 from each other and weakens the coupling therebetween. Reducing coupling via the pull-down electrodes 104A, 104B significantly reduces off-state capacitance and associated losses. Further, such a configuration may enable more advanced applications of relays as tuning elements, such as in high-end, front-ends (e.g., mobile handset).

In certain embodiments, isolation circuit 124 includes resistors 124A', 124B' disposed between a pull-down electrodes 104A, 104B, and the Vdn coupling 114 such that the Vdn coupling 114 is isolated to provide proper control of voltage within the MEMS switch 100.

Although described above as a single switch, other arrangements may be utilized. Multiple relays may be included together into one arrangement. In 20 some non-limiting embodiments, four relays may be provided.

Figure 3A:
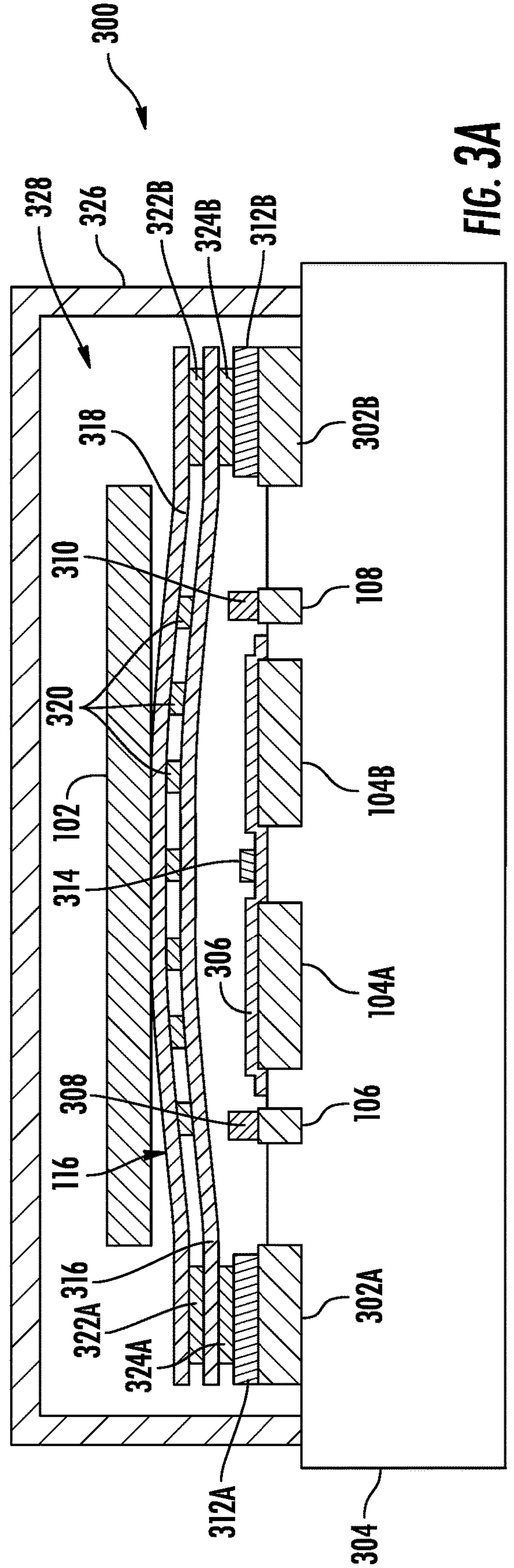
FIG. 3A is a cross-sectional side view of one embodiment of the MEMS switch of FIGS. 2A-2B in an off-state.
Figure 3B:
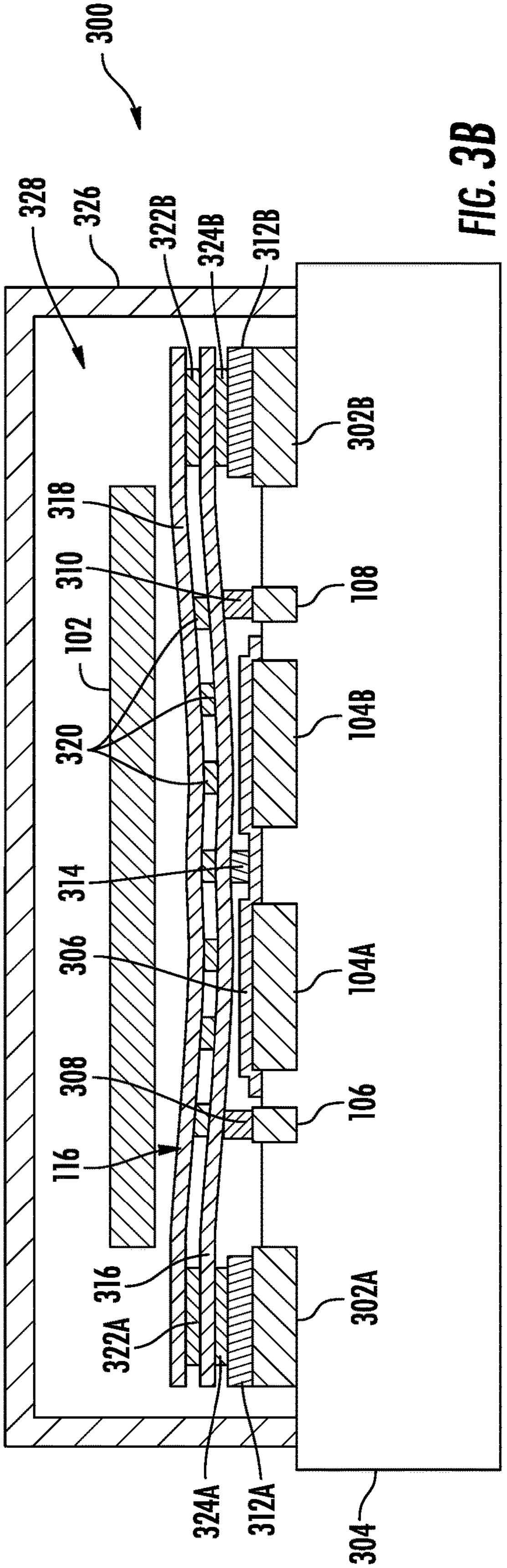
FIG. 3B is a cross-sectional side view of the MEMS switch of FIG. 3A in an on-state.

FIGS. 3A-3B are views of one embodiment of the MEMS switch 200 of FIGS. 2A-2C. The MEMS ohmic switch 300 includes an input terminal electrode 106, an output terminal electrode 108, a pull-up electrode 102, a plurality of pull-down electrodes 104A, 104B positioned between the input terminal electrode 106 and the output terminal electrode 108, a movable beam 116, and anchor electrodes 302A, 302B. The MEMS switch 300 further includes a substrate 304 with the input terminal electrode 106, output terminal electrode 108, plurality of pull-down electrodes 104A, 104B, and anchor electrodes 302A, 302B mounted on the substrate 304.

The pull-down electrodes 104A, 104B are covered with a dielectric layer 306 to avoid a short-circuit between the movable beam 116 and the pull-down electrodes 104A, 104B in the on-state. Suitable materials for the dielectric layer 306 include silicon-based materials including silicon-oxide, silicon-dioxide, silicon-nitride, and silicon-oxynitride. The thickness of the dielectric layer 306 is typically in the range of 50 nm to 150 nm to limit the electric field in the dielectric layer 306.

On top of the input terminal electrode 106 is the input terminal contact 308 (may also be referred to as an input RF contact), and on top of the output terminal electrode 108 is the output terminal contact 310 (may also be referred to as an output RF contact). The movable beam 116 forms an ohmic contact with the input terminal electrode 106 and the output terminal electrode 108 in the pulled-down state. On top of the anchor electrodes 302A, 302B are anchor contacts 312A, 312B to which the movable beam 116 is anchored. Suitable materials used for the contacts 308, 310, 312A, 312B include Ti, TiN, TiAl, TiAlN, AlN, Al, W, Pt, Ir, Rh, Ru, $RuO_2$, ITO, and Mo and combinations thereof.

In certain embodiments, the MEMS switch 300 includes a center stopper 314 positioned on the dielectric layer 306. The center stopper 314 extends above the substrate 304 by a greater distance than the terminal contacts 308, 310, so that upon actuation, the moveable beam 116 comes into contact with center stopper 314 first. In one embodiment, the center stopper 314 extends above the substrate 304 by a distance that is equal to the terminal contacts 308, 310. Suitable materials that may be used for the stopper 314 include Ti, TiN, TiAl, TiAlN, AlN, Al, W, Pt, Ir, Rh, Ru, $RuO_2$, ITO, Mo, and silicon-based materials such as silicon-oxide, silicon-dioxide, silicon-nitride, and silicon-oxynitride and combinations thereof.

The movable beam 116 (may also be referred to as a switching element, MEMS bridge, etc.) includes lower conductive layer 316 and upper conductive layer 318, which are joined together using an array of vias 320. Opposing ends of the upper layer 318 are anchored to opposing ends of the lower layer 316 by vias 322A, 322B. Opposing ends of the lower conductive layer 316 of the moveable beam 116 are anchored to the anchor contacts 312A, 312B by vias 324A, 324B, which provides low compliance to permit operating voltages (e.g., 25V to 40V) to pull the moveable beam 116 in contact with the terminal contacts 308, 310 and center stopper 314. This allows for a cheap integration of the CMOS (complementary metal-oxide-semiconductor) controller with a charge-pump to generate the voltages to drive the MEMS switch 300. In other words, ends of the movable beam 116 are mounted to the substrate 304 such that the movable beam 116 is suspended above the input terminal electrode 106, output terminal electrode 108, and plurality of pull-down electrodes 104A, 104B in the off state.

FIG. 3A illustrates the MEMS switch 300 in an off-state with the pull-up electrode 102 drawing the moveable beam 116 upward toward the pull-up electrode 102 and away from the pull-down electrodes 104A, 104B, input electrode 106, and output electrode 108. FIG. 3B illustrates the MEMS switch 300 in an on-state with the pull-down electrodes 104A, 104B drawing the moveable beam 116 downward toward the pull-down electrodes 104A, 104B and away from the pull-up electrode 102. Current injected from the input terminal contact 308 into the moveable beam 116 when the MEMS switch 300 is actuated downflows out through the moveable beam 116 and output terminal contact 310. The thicknesses of terminal contacts 308, 310 and center stopper 314 is set such that the center stopper 314 is engaged first upon pull-down actuation.

In certain embodiments, the MEMS switch 300 includes a cover 326 mounted to the substrate 304 and defines a cavity 328 between the cover 326 and the substrate 304. The movable beam 116 is positioned within the cavity 328.

Figure 4:
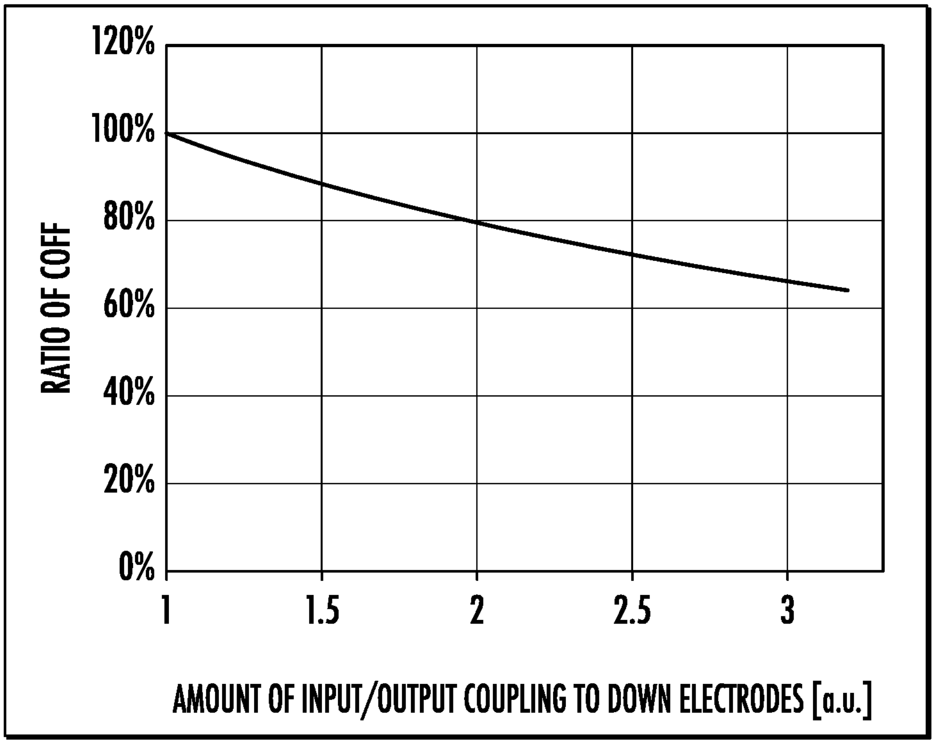
FIG. 4 is a graph illustrating a ratio of off-state capacitance relative to the amount of coupling to down electrodes.

FIG. 4 is a graph illustrating a ratio of off-state capacitance relative to the amount of coupling to pull-down electrodes 104A, 104B. In particular, the graph illustrates increasing the number of pull-down electrodes 104A, 104B decreases the off-state capacitance and accordingly decreases electrical losses.

Figure 5A:
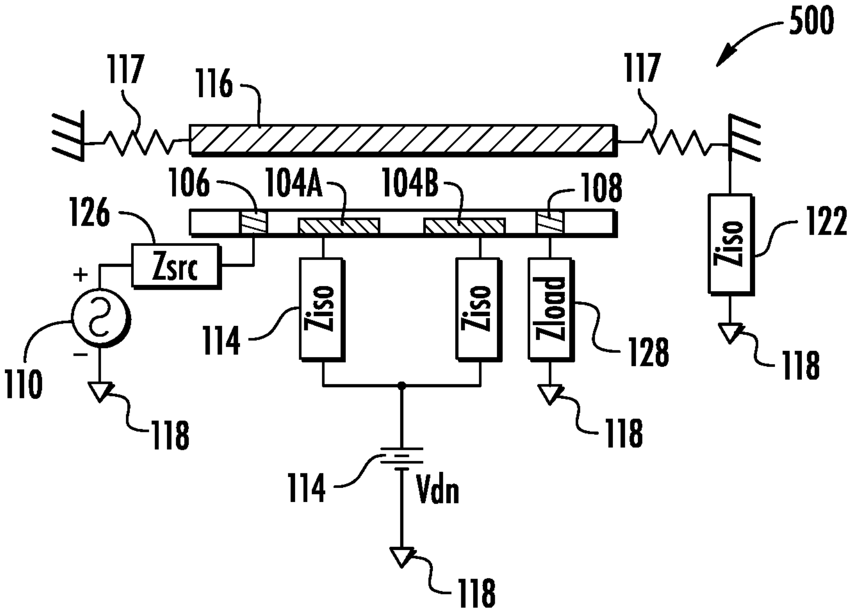
FIG. 5A is a schematic diagram of a MEMS switch in an off-state including a plurality of the pull-down electrodes between the terminal electrodes and devoid of a pull-up electrode.
Figure 5B:
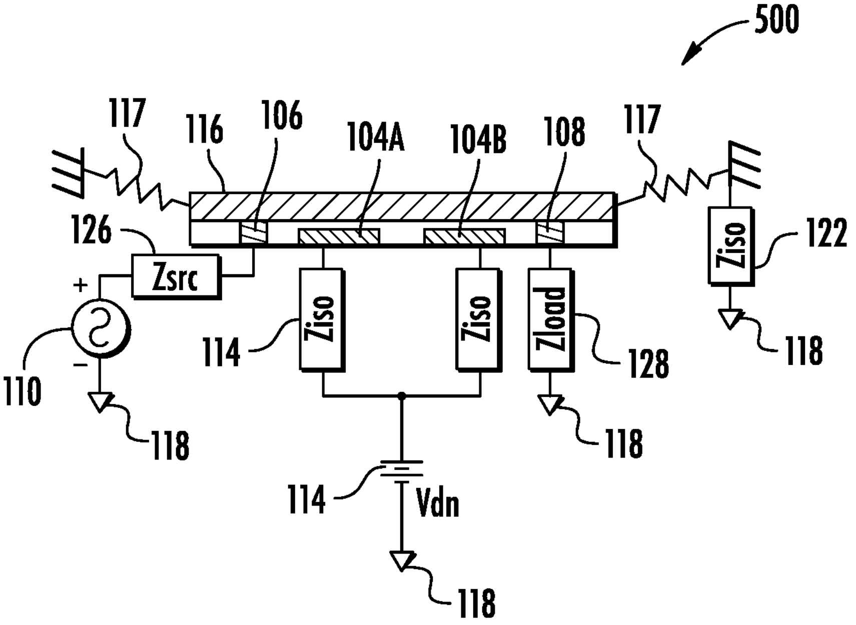
FIG. 5B is a schematic diagram of the MEMS switch of FIG. 5A in an on-state.

FIGS. 5A-5B illustrate a MEMS switch 500 including a plurality of the pull-down electrodes 104A, 104B between the terminal electrodes 106, 108 and is devoid of a pull-up electrode 102. MEMS switch 500 is similar to the MEMS switch 200 of FIGS. 2A-2C except where otherwise noted. Instead, the moveable beam 116 includes a stiffness (e.g., mechanical spring constant) to bias the moveable beam 116 to the off state away from the input electrode 106, output electrode 108, and pull-down electrodes 104A, 104B. Accordingly, in the on-state, the moveable beam 116 bends toward the pull-down electrodes 104A, 104B, and when voltage from Vdn coupling 114 is cut off, the moveable beam 116 mechanically returns to the off state. In other words, the moveable beam 116 is mechanically biased toward the off state.

Figure 6A:
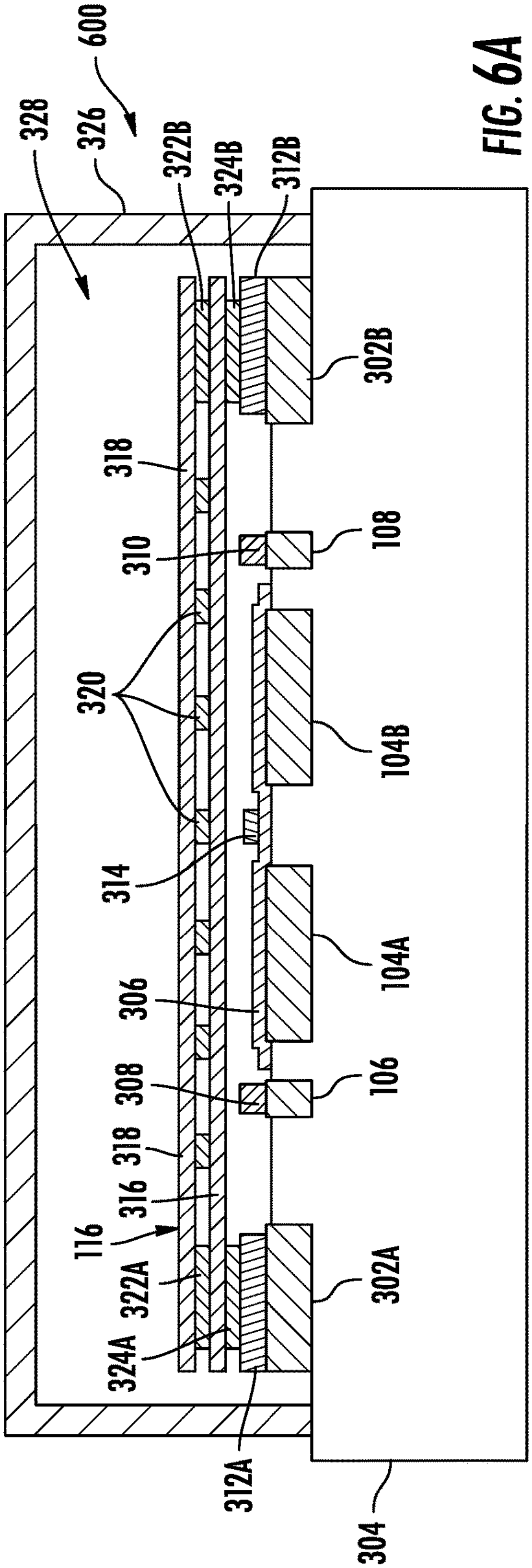
FIG. 6A is a cross-sectional side view of one embodiment of the MEMS switch of FIGS. 3A-3B in an off-state.
Figure 6B:
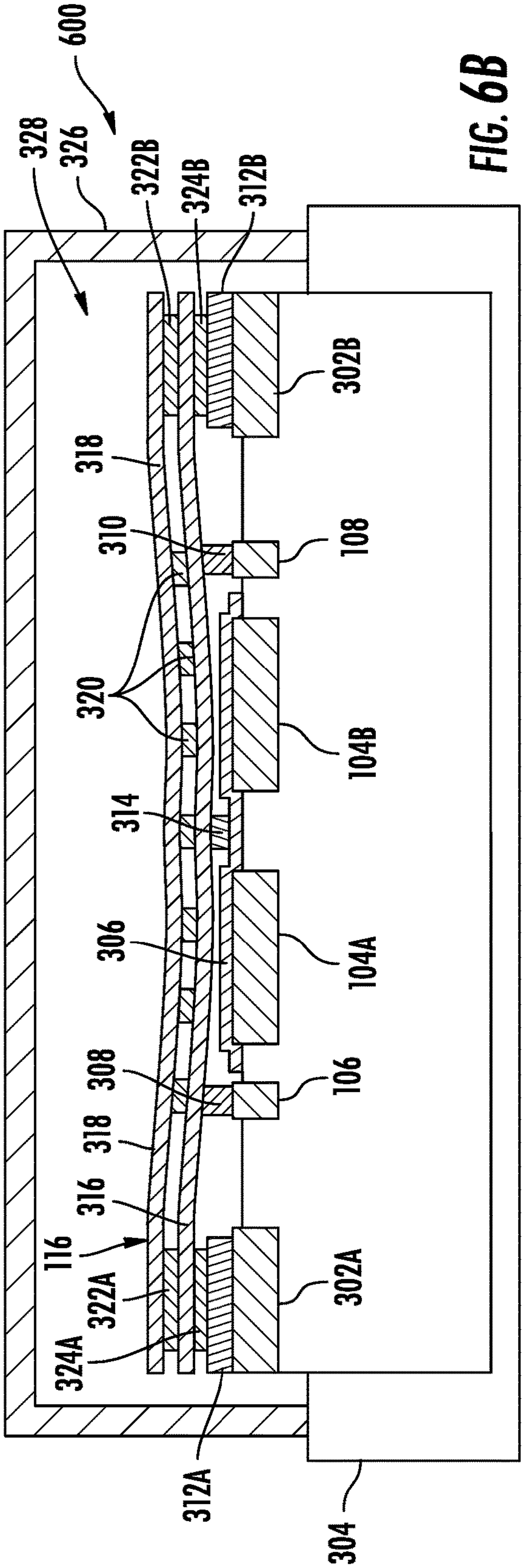
FIG. 6B is a cross-sectional side view of the MEMS switch of FIG. 6A in an on-state.

FIGS. 6A-6B are cross-sectional side views of one embodiment of the MEMS switch 500 of FIGS. 5A-5B in an off state. The MEMS switch 600 is similar to the MEMS switch 300 of FIGS. 3A-3B except where otherwise noted. As similarly noted in FIGS. 5A-5B, the MEMS switch 600 is devoid of a pull-up electrode 102. Instead, the moveable beam 116 includes a stiffness to bias the moveable beam 116 to the off state away from the input electrode 106, output electrode 108, and pull-down electrodes 104A, 104B.

Figure 7A:
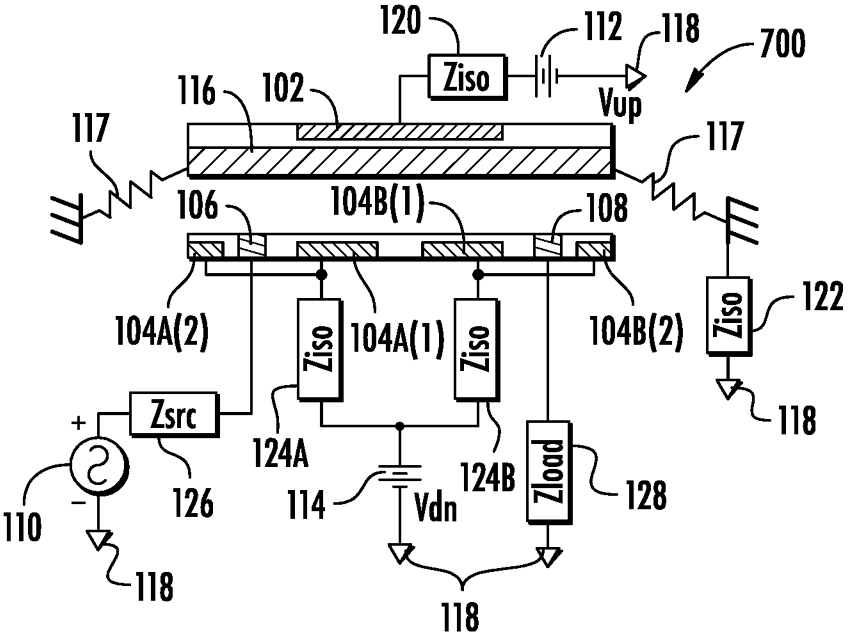
FIG. 7A is a schematic diagram of a MEMS switch in an off-state including a plurality of proximal pull-down electrodes between the terminal electrodes, distal pull-down electrodes, and a pull-up electrode.
Figure 7B:
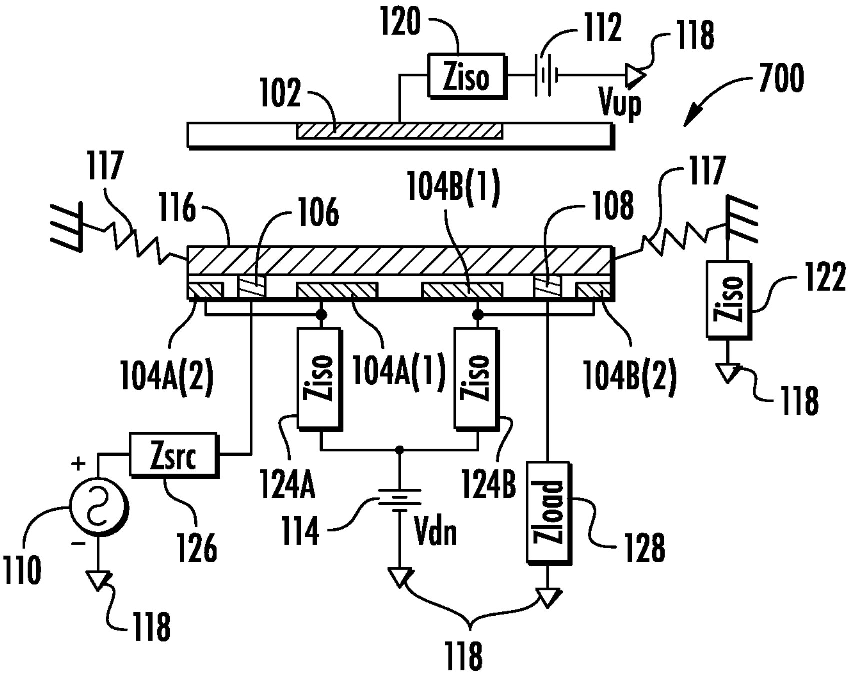
FIG. 7B is a schematic diagram of the MEMS switch of FIG. 7A in an on-state.

FIGS. 7A-7B illustrate a MEMS switch 700 including a plurality of proximal pull-down electrodes 104A(1), 104B (1) between the terminal electrodes 106, 108, distal pull-down electrodes 104A(2), 104B(2), and a pull-up electrode 102. MEMS switch 700 is similar to the MEMS switch 200 of FIGS. 2A-2C except where otherwise noted. The MEMS switch 700 includes two sets of pull-down electrodes. The first set includes a proximal pull-down electrode 104A(1) (may also be referred to as a center pull-down electrode, interior pull-down electrode, etc.) and a distal pull-down electrode 104A(2) (may also be referred to as an edge pull-down electrode, exterior pull-down electrode, etc.) positioned on opposite sides of input electrode 106. The second set includes a proximal pull-down electrode 104B(1) and a distal pull-down electrode 104B(2) positioned on opposite sides of the output electrode 108. In particular, proximal electrodes 104A(1), 104B(1) are positioned between the input electrode 106 and the output electrode 108.

The first set of pull-down electrodes 104A(1), 104A(2) are in electrical communication with isolation circuit 124A, and the second set of pull-down electrodes 104B(1), 104B (2) are in electrical communication with isolation circuit 124B. In other words, each of the first set of pull-down electrodes 104A(1), 104A(2) is coupled to a first down isolation circuit 124A and each of the second set of pull-down electrodes 1046(1), 104B(2) is coupled to a second down isolation circuit 124B to isolate a Vdn coupling 114 from the plurality of pull-down electrodes 104A(1)-104B (2).

Figure 8A:
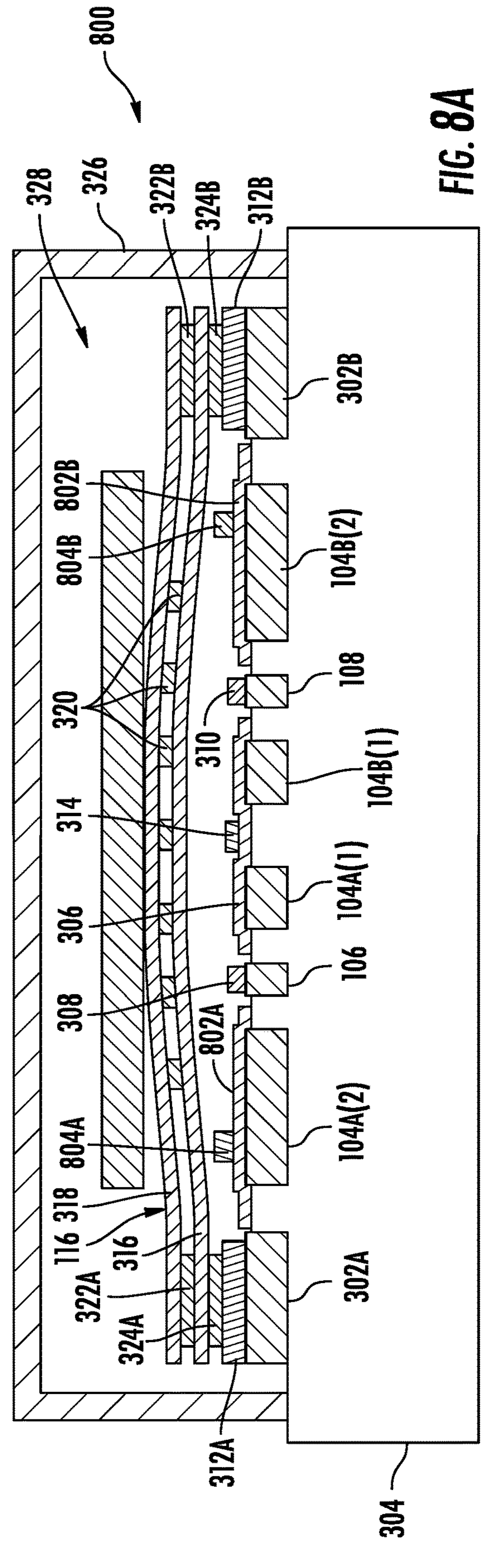
FIG. 8A is a cross-sectional side view of one embodiment of the MEMS switch of FIGS. 7A-7B in an off-state.
Figure 8B:
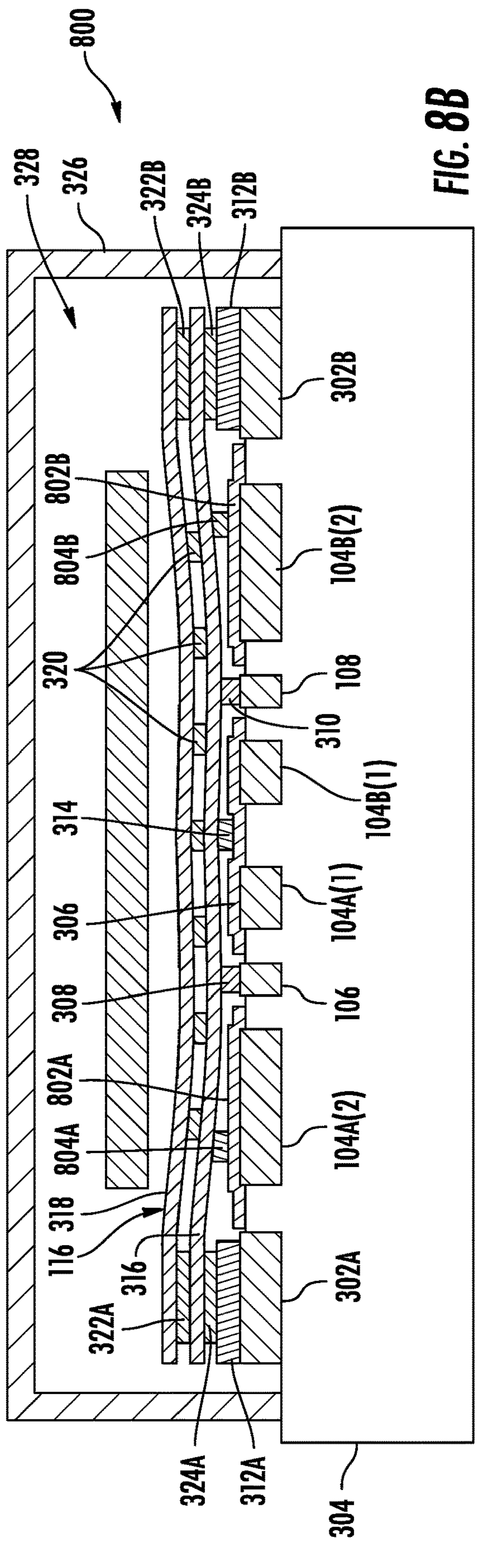
FIG. 8B is a cross-sectional side view of the MEMS switch of FIG. 8A in an on-state.

FIGS. 8A-8B are cross-sectional side views of one embodiment of the MEMS switch 700 of FIGS. 7A-7B in an off-state. The MEMS switch 800 is similar to the MEMS switch 300 of FIGS. 3A-3B except where otherwise noted. The MEMS switch 800 includes distal pull-down electrodes 104A(2), 104B(2), each with a dielectric layer 802A, 802B. Further, the MEMS switch 800 includes edge stoppers 804A, 804B positioned on the dielectric layers 802A, 802B, respectively. In particular, edge stoppers 804A, 804B are disposed between the terminal contacts 308, 310 and the anchor contacts 312A, 3126. Specifically, edge stopper 804A is disposed between anchor contact 312A and terminal contact 308. Edge stopper 804B is disposed between anchor contact 312B and terminal contact 310. The edge stoppers 804A, 804B extend above the substrate 304 by a greater distance than the terminal contacts 308, 310 so that upon actuation, the moveable beam 116 comes into contact with the edge stoppers 804A, 804B before coming into contact with terminal contacts 308, 310. The edge stoppers 804A, 804B also extend above the substrate 304 by a distance greater than the center stopper 314 due to the bending of the moveable beam 116 as the moveable beam 116 is actuated downwards. Suitable materials that may be used for the stoppers 804A, 804B, 314 include silicon-based materials including silicon-oxide, silicon-dioxide, silicon-nitride, and silicon-oxynitride and combinations thereof.

Figure 9A:
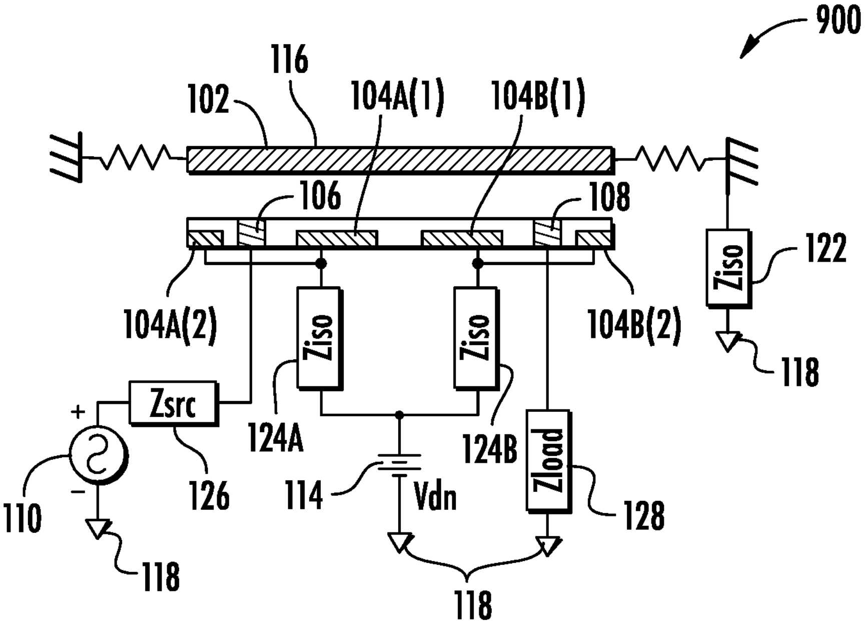
FIG. 9A is a schematic diagram of a MEMS switch in an off-state including a plurality of proximal pull-down electrodes between the terminal electrodes, distal pull-down electrodes, and devoid of a pull-up electrode.
Figure 9B:
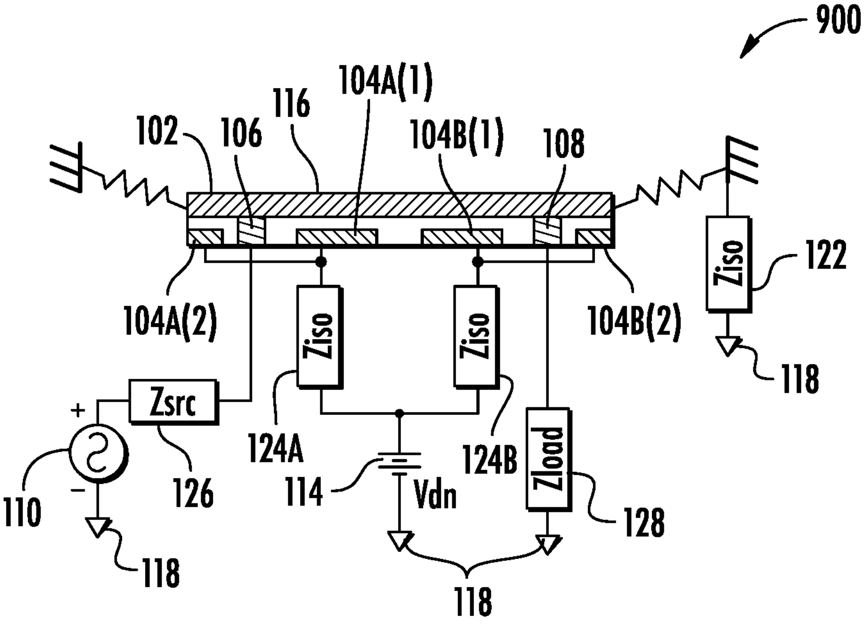
FIG. 9B is a schematic cross-sectional side view of the MEMS switch of FIG. 9A in an on-state.

FIGS. 9A-9B illustrates a MEMS switch 900, including a plurality of proximal pull-down electrodes 104A(2), 104B (2) between the terminal electrodes 106, 108, distal pull-down electrodes 104A(1), 104B(1), and devoid of a pull-up electrode 102. As similarly noted in FIGS. 5A-5B, the moveable beam 116 includes a stiffness to bias the moveable beam 116 to the off state away from the input electrode 106, output electrode 108, and pull-down electrodes 104A(1), 104B(1), 104A(2), 104B(2). Accordingly, in the on-state, the moveable beam 116 bends toward the pull-down electrodes 104A, 104B, and when voltage from Vdn coupling 114 is cut off, the moveable beam 116 mechanically returns to the off state. In other words, the moveable beam 116 is mechanically biased toward the off state.

Figure 10A:
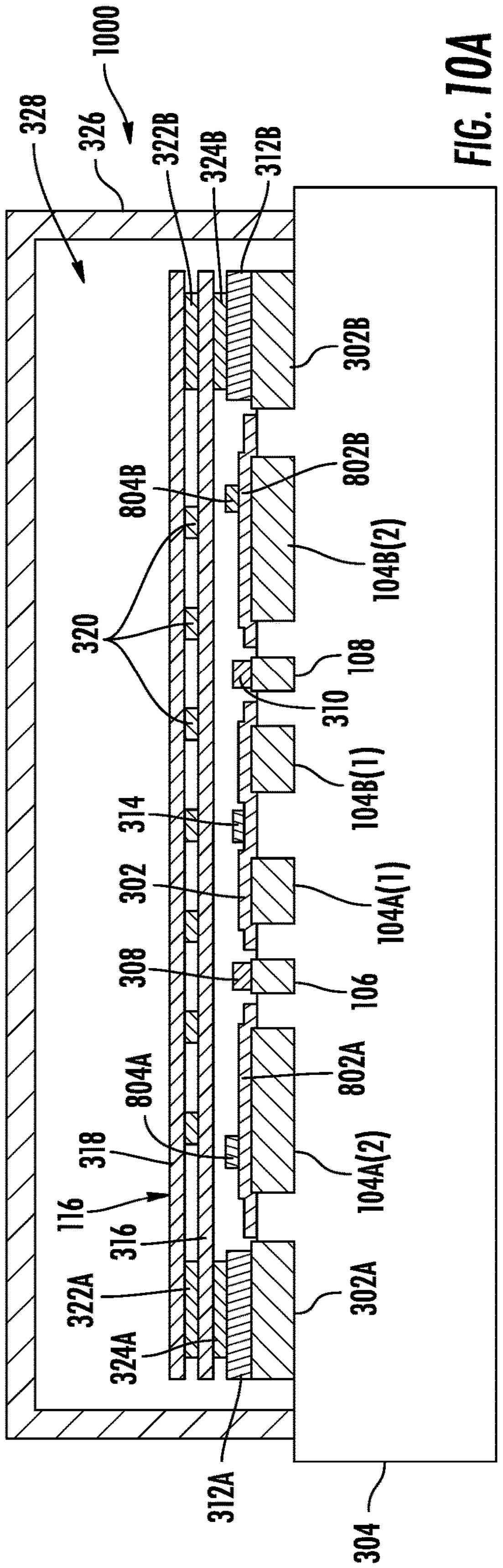
FIG. 10A is a cross-sectional side view of one embodiment of the MEMS switch of FIGS. 9A-9B in an off-state.
Figure 10B:
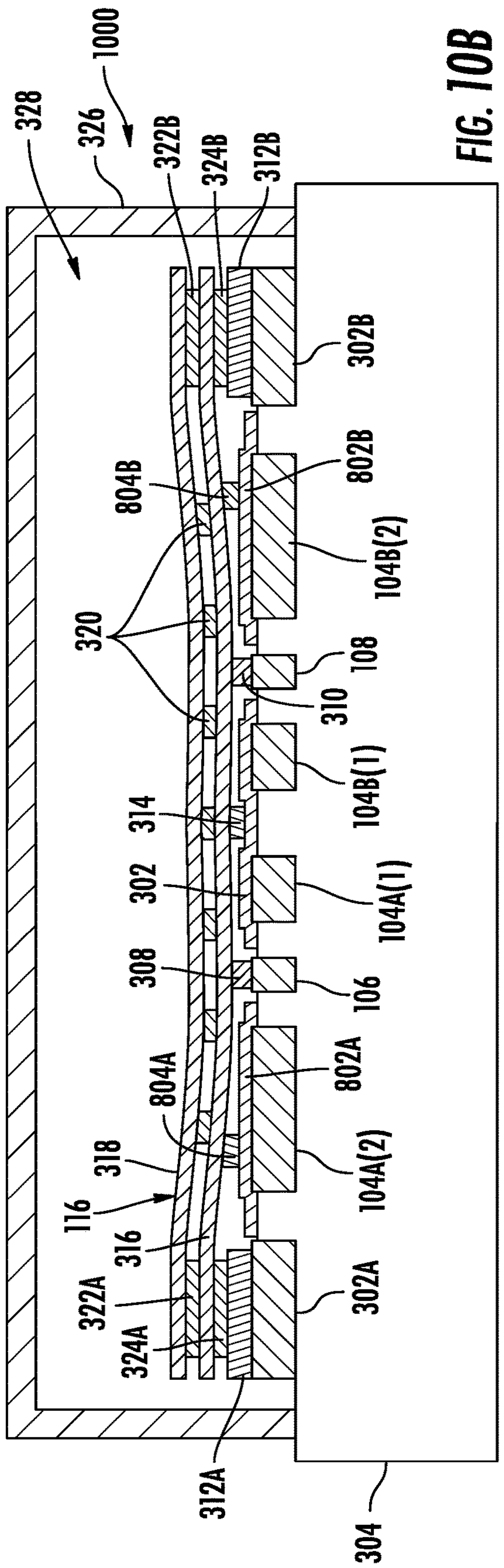
FIG. 10B is a cross-sectional side view of the MEMS switch of FIG. 10A in an on-state.

FIGS. 10A-10B are cross-sectional side views of one embodiment of the MEMS switch 900 of FIGS. 9A-9B in an off state. The MEMS switch 1000 is similar to the MEMS switch 300 of FIGS. 3A-3B and MEMS switch 800 of FIGS. 8A-8B except where otherwise noted. As similarly noted in FIGS. 5A-5B, the MEMS switch 1000 is devoid of a pull-up electrode 102. Instead, the moveable beam 116 includes a stiffness to bias the moveable beam 116 to the off state away from the input electrode 106, output electrode 108, and pull-down electrodes 104A(1)-104B(2).

Figure 11:
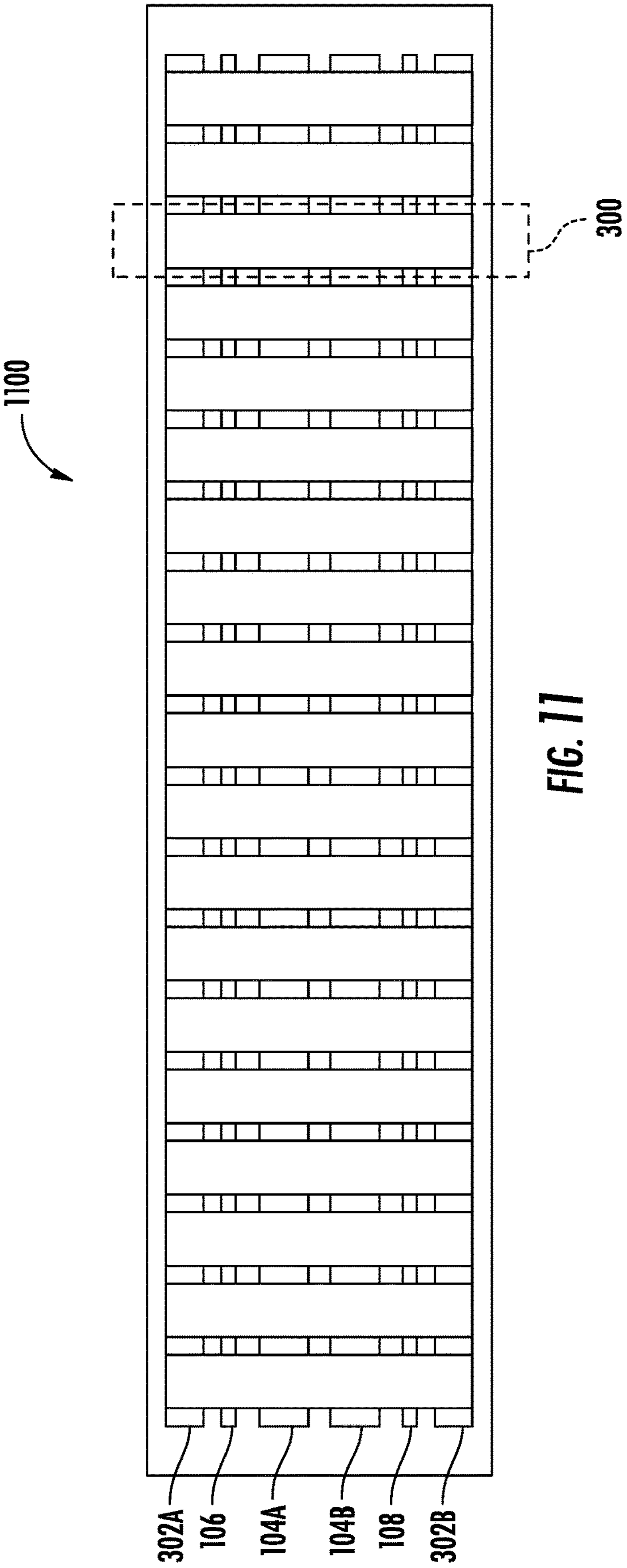
FIG. 11 is a schematic top view of a switch cell 1100 containing a number of MEMS switches 300.

FIG. 11 is a schematic top view of a switch cell 1100 containing a number of MEMS switches 300. All MEMS switches 300 in the cell 1100 are turned on simultaneously by applying a sufficiently high voltage to the pull-down electrodes 104A, 104B. Although MEMS switch 300 is illustrated, a similar configuration could be used for any of the MEMS switches disclosed herein.

Those skilled in the art will recognize improvements and modifications to the preferred embodiments of the present disclosure. All such improvements and modifications are considered within the scope of the concepts disclosed herein and the claims that follow.

What is claimed is:

1. A microelectromechanical system (MEMS) switch, comprising:
- an input terminal electrode;
- an output terminal electrode;
- a plurality of pull-down electrodes positioned between the input terminal electrode and the output terminal electrode;
- a beam element configured to move between:
  - an on-state adjacent to the plurality of pull-down electrodes to electrically couple the input terminal electrode and the output terminal electrode to the beam element; and
  - an off state away from the plurality of pull-down electrodes to electrically isolate the input terminal electrode and the output terminal electrode from the beam element;
- wherein the plurality of pull-down electrodes are offset from each other to limit off-state capacitance between the input terminal electrode and the output terminal electrode;
- wherein the plurality of pull-down electrodes comprises a first set of pull-down electrodes and a second set of pull-down electrodes;
- wherein the first set of pull-down electrodes include a first proximal electrode and a first distal electrode positioned on opposite sides of the input terminal electrode; and
- wherein the second set of pull-down electrodes include a second proximal electrode and a second distal electrode positioned on opposite sides of the output terminal electrode.

2. The MEMS switch of claim 1, wherein the input terminal electrode comprises an input RF electrode, and the output terminal electrode comprises an output RF electrode.

3. The MEMS switch of claim 1, wherein the moveable beam is coupled to an RF node.

4. The MEMS switch of claim 1, wherein the beam element is mechanically biased toward the off state.

5. The MEMS switch of claim 1, further comprising a pull-up electrode configured to electrically bias the beam element toward the off state.

6. The MEMS switch of claim 1, further comprising a plurality of pull-up electrodes configured to electrically bias the beam element toward the off state.

7. The MEMS switch of claim 1, further comprising an isolation circuit between the beam element and an electrical common ground connection.

8. The MEMS switch of claim 1, further comprising a pull-up electrode configured to electrically bias the beam element toward the off state, the pull-up electrode coupled to an up isolation circuit to isolate an upper voltage source from the pull-up electrode.

9. The MEMS switch of claim 1, further comprising a substrate;

wherein the input terminal electrode, output terminal electrode, and plurality of pull-down electrodes are mounted on the substrate;

wherein ends of the beam element are mounted to the substrate such that the beam element is suspended above the input terminal electrode, output terminal electrode, and plurality of pull-down electrodes in the off state.

10. The MEMS switch of claim 9, further comprising a cover mounted to the substrate and defining a cavity between the cover and the substrate;

wherein the beam element is positioned within the cavity.

11. The MEMS switch of claim 9, wherein for each MEMS switch, the beam element is mechanically biased toward the off state.

12. The MEMS switch of claim 9, wherein each MEMS switch further comprises a pull-up electrode configured to electrically bias the beam element toward the off state.

13. The MEMS switch of claim 9, wherein each MEMS switch further comprises a plurality of pull-up electrodes configured to electrically bias the beam element toward the off state.

14. A microelectromechanical system (MEMS), comprising:

a plurality of MEMS switches, each switch comprising:

an input terminal electrode;

an output terminal electrode;

a plurality of pull-down electrodes positioned between the input terminal electrode and the output terminal electrode;

a beam element configured to move between:

an on-state adjacent to the plurality of pull-down electrodes to electrically couple the input terminal electrode and the output terminal electrode to the beam element; and an off state away from the plurality of pull-down electrodes to electrically isolate the input terminal electrode and the output terminal electrode from the beam element;

wherein the plurality of pull-down electrodes are offset from each other to limit off-state capacitance between the input terminal electrode and the output terminal electrode;

wherein the plurality of pull-down electrodes comprises a first set of pull-down electrodes and a second set of pull-down electrodes;

wherein the first set of pull-down electrodes include a first proximal electrode and a first distal electrode positioned on opposite sides of the input terminal electrode; and wherein the second set of pull-down electrodes include a second proximal electrode and a second distal electrode positioned on opposite sides of the output terminal electrode.

* * * * *